UNITED STATES PATENT OFFICE.

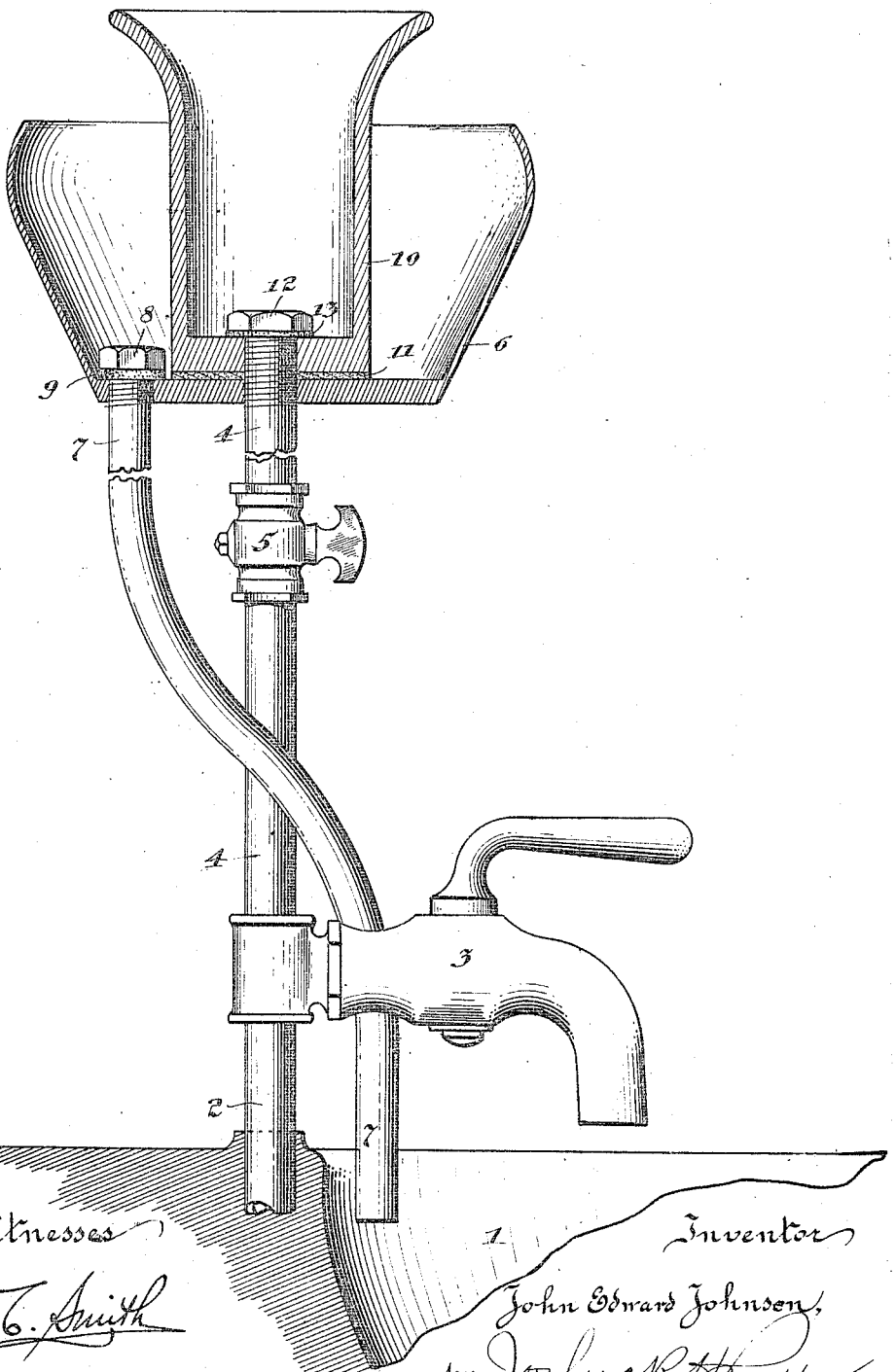

JOHN EDWARD JOHNSEN, OF CHICAGO, ILLINOIS.

DRINKING-FOUNTAIN.

998,581.

Specification of Letters Patent.   Patented July 18, 1911.

Application filed November 16, 1910.   Serial No. 592,671.

*To all whom it may concern:*

Be it known that I, JOHN EDWARD JOHNSEN, a citizen of the United States, and a resident of the city of Chicago, county of Cook, and State of Illinois, have invented certain new and useful Improvements in Drinking-Fountains, of which the following is a specification.

My invention relates to improvements in drinking fountains and has for its object the provision of a drinking fountain of improved construction and operation.

The invention consists in the combinations and arrangements of parts hereinafter described and claimed.

My invention will be best understood by reference to the accompanying drawing forming a part of this specification and which consists of an elevation, partially in section, of a drinking fountain embodying my invention.

The preferred form of construction as illustrated in the drawing comprises a wash bowl 1 of an ordinary stationary wash stand and provided with a cold water supply pipe 2 and faucet 3 leading thereto. A branch pipe 4 is connected with cold water pipe 2 and projects upwardly therefrom, being provided with a valve 5 by means of which the passage of water therethrough may be permitted or disconnected as desired. A drain bowl 6 is threaded to the upper end of pipe 4 and is provided with a drain pipe 7 threaded in the bottom thereof and leading to wash bowl 1. A nut 8 is threaded on the upper end of pipe 7 within bowl 6 and a gasket 9 is interposed between said nut and the bottom of bowl 6 to prevent leakage. A drinking cup 10 is threaded to the upper end of pipe 4 within bowl 6 and extends well above the upper edges of drain bowl 6 as shown. A gasket 11 is interposed between the bottoms of cup 10 and bowl 6 and a nut 12, provided with a gasket 13, is threaded on the upper end of pipe 4 within cup 10 as shown.

By this arrangement it will be observed that drinking water may be supplied to cup 10 when desired without interfering with the usual functions of faucet 3 and that the over flow from cup 10 will be drained into wash bowl 1 through bowl 6 and pipe 7. The connections between the drain bowl and drinking cup and the drain and supply pipes are simple and efficient for the end sought.

While I have illustrated and described the preferred form of construction for carrying my invention into effect, this is capable of variations and modifications without departing from the spirit of my invention. I, therefore, do not wish to be limited to the exact details of construction as set forth but desire to avail myself of such variations and modifications as come within the scope of the appended claims.

Having described my invention what I deem as new and desire to secure by Letters Patent is:

1. The combination with a stationary wash bowl, of a cold water pipe and faucet leading thereto; an upwardly extending branch pipe connected with said cold water pipe; a valve in said branch pipe; a drain bowl threaded to the upper end of said branch pipe; a drain pipe threaded in the bottom of and leading from said drain bowl to said wash bowl; a nut threaded on the end of said drain pipe within said drain bowl; a gasket interposed between said nut and the bottom of said drain bowl; a drinking cup threaded to the upper end of said branch pipe within and extending well above said drain bowl; a gasket interposed between the bottom of said cup and drain bowl; a nut on the upper end of said branch pipe within said cup; and a gasket interposed between said nut and the bottom of said cup, substantially as described.

2. The combination with a supply pipe and drain bowl threaded to the upper end of said pipe; a drain pipe threaded in the bottom and leading from said drain bowl; a nut threaded on the end of said drain pipe within said drain bowl; a gasket interposed between said nut and the bottom of said drain bowl; a drinking cup threaded to the upper end of said supply pipe within and extending well above said drain bowl; a gasket interposed between the bottom of said cup and drain bowl; a nut on the upper end of said supply pipe within said cup; and a gasket interposed between said nut and the bottom of said cup, substantially as described.

In testimony whereof I have signed my name to this specification in the presence of two subscribing witnesses.

JOHN EDWARD JOHNSEN.

Witnesses:
HELEN F. LILLIS,
JOSHUA R. H. POTTS.